United States Patent
Imamura et al.

(10) Patent No.: US 11,947,364 B2
(45) Date of Patent: Apr. 2, 2024

(54) VESSEL ANTI-ROLLING CONTROL APPARATUS AND ANTI-ROLLING CONTROL METHOD

(71) Applicant: Mitsubishi Electric Corporation, Tokyo (JP)

(72) Inventors: Naoki Imamura, Tokyo (JP); Ryo Sakaguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 295 days.

(21) Appl. No.: 17/557,960

(22) Filed: Dec. 21, 2021

(65) Prior Publication Data

US 2022/0269289 A1  Aug. 25, 2022

(30) Foreign Application Priority Data

Feb. 22, 2021 (JP) .................... 2021-026024

(51) Int. Cl.
| | |
|---|---|
| *G05D 1/08* | (2006.01) |
| *B63B 39/00* | (2006.01) |
| *B63B 79/10* | (2020.01) |
| *B63B 79/40* | (2020.01) |
| *G05D 1/00* | (2006.01) |

(52) U.S. Cl.
CPC ........... *G05D 1/0875* (2013.01); *B63B 39/00* (2013.01); *B63B 79/10* (2020.01); *B63B 79/40* (2020.01)

(58) Field of Classification Search
CPC ...... G05D 1/0875; B63B 39/00; B63B 79/10; B63B 79/40; B63B 2035/009; B63B 39/06; B63H 25/04
See application file for complete search history.

(56) References Cited

U.S. PATENT DOCUMENTS

| | | | | |
|---|---|---|---|---|
| 11,372,411 | B1* | 6/2022 | Derginer | ............... B63B 39/061 |
| 2019/0324462 | A1 | 10/2019 | Imamura et al. | |

FOREIGN PATENT DOCUMENTS

| | | |
|---|---|---|
| JP | 04-321485 A | 11/1992 |
| JP | 2003-226289 A | 8/2003 |
| JP | 2019-188830 A | 10/2019 |

OTHER PUBLICATIONS

Office Action dated Mar. 29, 2022 issued by the Japanese Patent Office in Japanese Application No. 2021-026024.

* cited by examiner

*Primary Examiner* — Michael V Kerrigan
(74) *Attorney, Agent, or Firm* — Sughrue Mion, PLLC; Richard C. Turner

(57) ABSTRACT

In a conventional vessel anti-rolling apparatus, because a large memory capacity and a high-speed high-function computing processing unit are required, the cost of the vessel anti-rolling apparatus is caused to rise. A vessel anti-rolling control apparatus and an anti-rolling control method according to the present disclosure includes
 an azimuth controller that outputs a first steering-angle command value for making the vessel turn to an azimuth to which the vessel should travel, based on an azimuth command signal and a yaw-angle signal,
 an anti-rolling controller that outputs a second steering-angle command value for reducing rolling of the vessel, based on a rolling-angle signal, a rolling-angular-velocity signal, and a vessel-speed signal, and
 a steering-angle controller that controls a steering angle, based on the first steering-angle command value and the second steering-angle command value.

17 Claims, 10 Drawing Sheets

VESSEL ANTI-ROLLING CONTROL APPARATUS AND ANTI-ROLLING CONTROL METHOD

BACKGROUND OF THE INVENTION

Field of the Invention

The present disclosure relates to a vessel anti-rolling control apparatus and an anti-rolling control method.

Description of the Related Art

On the water, there occurs a rolling motion in which a vessel rotates on the anteroposterior-direction axis passing through the gravity center of the hull. This rolling motion will be referred to as rolling. An anti-rolling apparatus for reducing rolling of a vessel exists.

There has been proposed an apparatus that reduces rolling by utilizing inward inclination caused by steering of a sailing vessel. In a vessel, a detector detects a rolling angle, a rolling angular velocity, a traveling direction, a vessel speed, and a steering angle. Based on temporal-sequence detected data pieces, a control model is created. A control gain is determined by use of the created model. A technology regarding to this series of steps has been disclosed (e.g., Patent Document 1).

The foregoing anti-rolling apparatus has a statistic control-gain creation means, a control-gain storage means, and a control execution means. Among these means, the statistic control-gain creation means creates a control model and calculates a control gain, based on respective signals from a rolling detector, an azimuth detector, a vessel speed detector, a steering angle detector, a course setting device. The control model is a multidimensional autoregressive type. A correlation coefficient matrix A between a controlled variable (a rolling angle, a rolling angular velocity, an azimuth, or the like) and its controlled-variable target value (a fixed value, e.g., 0) and a correlation coefficient matrix B between a control input (a steering angle or the like) and the controlled-variable target value are estimated based on data in a predetermined temporal interval. Then, the control gain is determined based on a model represented by the correlation coefficient matrix A and the correlation coefficient matrix B. The determined control gain is stored in the control-gain storage means. The control execution means executes control by use of the stored control gain.

PRIOR ART REFERENCE

Patent Literature

[Patent Document 1] Japanese Patent Application Laid-Open No. H4-321485

SUMMARY OF THE INVENTION

However, in the anti-rolling apparatus disclosed in Patent Document 1, it is required that in identification of a multi-dimensional-autoregressive model, the data amount and the model order are increased in order to raise the accuracy of model identification. Accordingly, the amount of data to be obtained becomes massive and hence the calculation load increases. As a result, because a large memory capacity and a high-speed high-function computing processing unit are required, the cost of the vessel anti-rolling apparatus is caused to rise. Moreover, it is conceivable that because the amount of calculation processing becomes excessive and hence the calculation is not completed for a short time, model construction becomes insufficient. It is also conceivable that when the model construction becomes insufficient, the control gain is determined by use of a model based on an erroneous correlation coefficient matrix and hence the control system becomes unstable.

The present disclosure has been implemented in order to solve the foregoing problems; the objective thereof is to obtain a vessel anti-rolling control apparatus and an anti-rolling control method that can execute, through a simple calculation, a series of operation items in which when while a vessel sails, there occurs a rolling motion in which the vessel rotates on the anteroposterior-direction axis passing through the gravity center of the hull, the vessel is controlled to be directed to an instructed azimuth while the rolling is suppressed through only steering.

A vessel anti-rolling control apparatus according to the present disclosure includes an azimuth commander that generates an azimuth command signal indicating an azimuth to which a vessel should travel, a yaw-angle detector that outputs a yaw-angle signal indicating a rotation angle around a vertical axis passing through the gravity center of the vessel, a rolling-angle detector that outputs a rolling-angle signal indicating a rotation angle around an anteroposterior-direction axis passing through the gravity center of the vessel, a rolling-angular-velocity detector that outputs a rolling-angular-velocity signal indicating a rotation angular velocity around an anteroposterior-direction axis passing through the gravity center of the vessel, a vessel-speed detector that outputs a vessel-speed signal indicating a vessel speed of the vessel, an azimuth controller that outputs a first steering-angle command value for making the vessel turn to an azimuth to which the vessel should travel, based on an azimuth command signal and a yaw-angle signal, an anti-rolling controller that outputs a second steering-angle command value for reducing rolling of the vessel, based on a rolling-angle signal, a rolling-angular-velocity signal, and a vessel-speed signal, and a steering-angle controller that controls a steering angle, based on the first steering-angle command value and the second steering-angle command value.

A vessel anti-rolling control method according to the present disclosure includes a step in which an azimuth commander generates an azimuth command signal indicating an azimuth to which a vessel should travel, a step in which a yaw-angle detector outputs a yaw-angle signal indicating a rotation angle around a vertical axis passing through the gravity center of the vessel, a step in which a rolling-angle detector outputs a rolling-angle signal indicating a rotation angle around an anteroposterior-direction axis passing through the gravity center of the vessel, a step in which a rolling-angular-velocity detector outputs a rolling-angular-velocity signal indicating a rotation angular velocity around an anteroposterior-direction axis passing through the gravity center of the vessel, a step in which a vessel-speed detector outputs a vessel-speed signal indicating a vessel speed of the vessel, a step in which in accordance with an error between the azimuth command signal and the yaw-angle signal, an azimuth controller outputs a first steering-angle command value for making the vessel turn to the azimuth to which the vessel should travel, a step in which an anti-rolling controller outputs a second steering-angle command value for reducing rolling of the vessel, based on the rolling-angle signal, the rolling-angular-velocity signal, and the vessel-speed signal, and a step in which a steering-angle controller controls a steering angle, based on the first steering-angle command value and the second steering-angle command value.

A vessel anti-rolling control apparatus and an anti-rolling control method according to the present disclosure can execute, through a simple calculation, a series of operation items in which when while a vessel sails, there occurs a rolling motion in which the vessel rotates on the anteroposterior-direction axis passing through the gravity center of the hull, the vessel is controlled to be directed to an instructed azimuth while the rolling is suppressed through only steering. Accordingly, a vessel anti-rolling control apparatus and an anti-rolling control method can be realized without requiring a large memory capacity and a high-speed high-function computing processing unit; thus, the cost hike can be suppressed. Moreover, the amount of calculation processing can be prevented from becoming excessive, and it can also be prevented that because when calculation is not completed in a short period, construction of the model becomes insufficient, the control gain is determined by use of the model based on an erroneous correlation coefficient matrix and hence the control system becomes unstable.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Hereinafter, embodiments of the present disclosure will be explained with reference to the drawings.

1. Embodiment 1

<Configuration of Anti-Rolling Control Apparatus>

Figure 1:
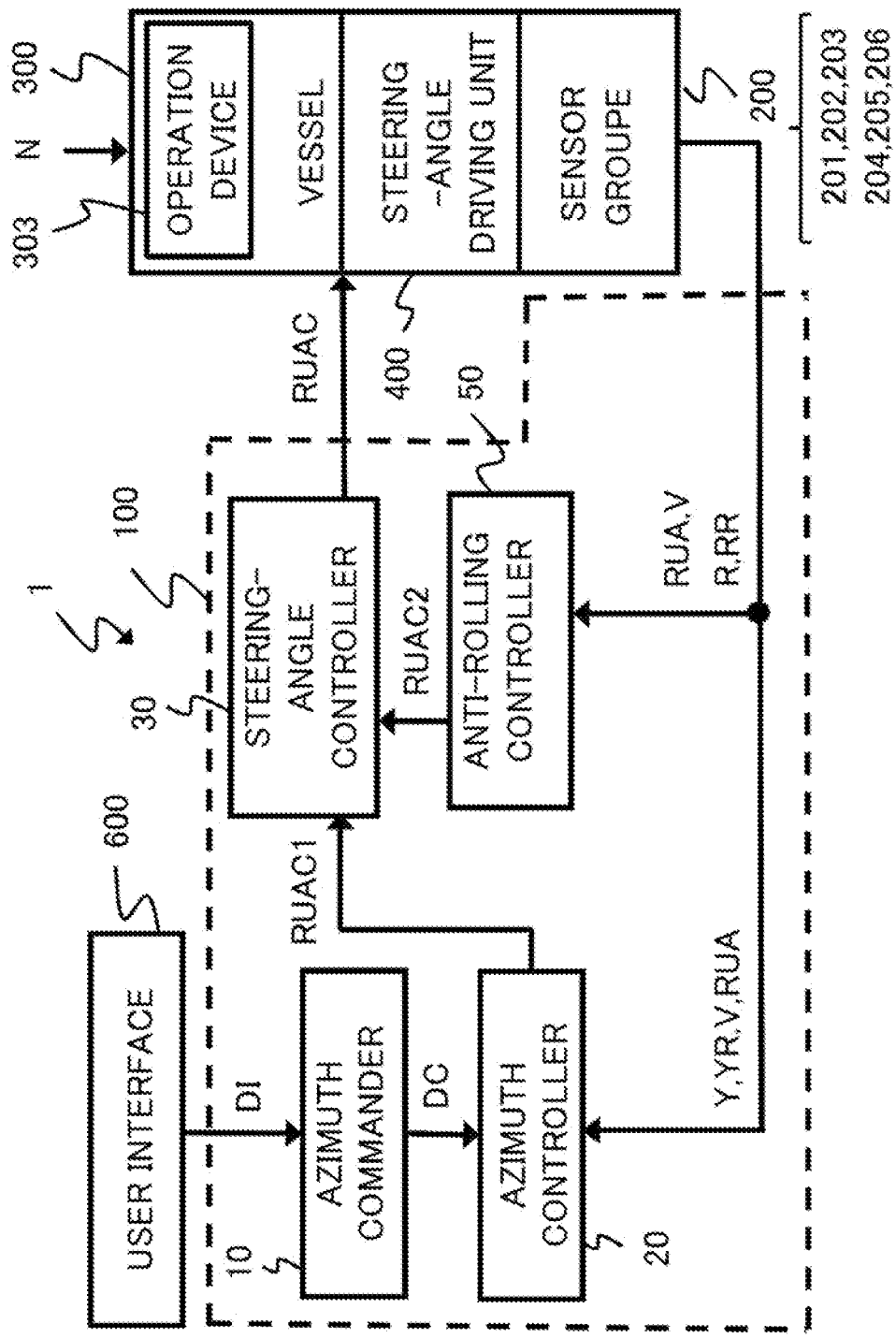
FIG. 1 is a configuration diagram of an anti-rolling control apparatus according to Embodiment 1.

FIG. 1 is a configuration diagram of an anti-rolling control apparatus according to Embodiment 1. An anti-rolling control apparatus 1 provided in a vessel 300 includes an electronic control system 100 and a sensor group 200. The electronic control system 100 includes an azimuth commander 10, an azimuth controller 20, an anti-rolling controller 50, and a steering-angle controller 30. The electronic control system 100 receives respective signals of detectors from the sensor group 200 and receives, from a user interface 600, azimuth information DI indicating an azimuth in which the vessel 300 should travel. Then, the electronic control system 100 outputs a steering-angle control command value RUAC to the steering-angle driving unit 400 so as to control the steering angle. The steering-angle driving unit 400 includes a steering-angle controller and a steering mechanism.

As the user interface 600 for creating the azimuth information DI with which a vessel operator holds the azimuth of the bow in an intended direction or changes the azimuth thereof into an intended direction, a joystick can be utilized. As the user interface 600, any kind of UI (user interface), such as a numerical-value input device with which a traveling azimuth can be inputted through a numerical value, a touch panel for instructing the steering by means of a fingertip of the vessel operator, or a speech recognizer for instructing the steering by means of a speech of the vessel operator, can be utilized.

The electronic control system 100 calculates a first steering-angle command value RUAC1 in accordance with a traveling azimuth instructed by the user interface 600 and a second steering-angle command value RUAC2 for suppressing rolling of the vessel. Then, based on the first steering-angle command value RUAC1 and the second steering-angle command value RUAC2, the electronic control system 100 outputs the optimum steering-angle control command value RUAC so as to control the steering angle, so that maintenance of the traveling azimuth and suppression of the rolling are concurrently performed.

The vessel 300 is provided with an unillustrated propulsion unit for propelling a vessel. The output of the propulsion unit is operated through an operational device 303. As the propulsion unit of the vessel 300, an outboard engine can be utilized. An outboard engine is a propulsion system whose main body is provided integrally with a screw situated under an engine is mounted outside a vessel, as a propelling and steering mechanism of the vessel. Control of a traveling azimuth by an outboard engine is performed by changing the mounting angle of the outboard-engine main body in the vessel. An outboard engine is often adopted in a small boat.

Application of the anti-rolling control apparatus 1 according to Embodiment 1 is not limited to a vessel provided with an outboard engine. In many cases, a large ship is provided with an inboard engine. An inboard engine is a propelling and steering mechanism having a form in which a driving unit such as an engine is disposed inside a vessel, in which a screw that is coupled with the driving unit and whose rotation direction is changeable is exposed outside the vessel, and in which the rudder is separated from the screw. The anti-rolling control apparatus 1 according to Embodiment 1 can be applied also to a vessel provided with a propulsion system based on an inboard engine.

In addition, there exists a vessel provided with an inboard-outdrive engine. An inboard-outdrive engine is a propelling and steering mechanism having a form in which a driving unit such as an engine is disposed inside a vessel and in which a screw that is coupled with the driving unit outside the vessel and whose rotation direction is changeable is integrated with the rudder. The anti-rolling control apparatus 1 according to Embodiment 1 can be applied also to a vessel provided with an inboard-outdrive engine.

External force exerted on the vessel 300 is indicated by a disturbance N. A disturbance is exerted on a vessel due to high ocean waves or strong wind and rain.

The vessel 300 is provided with the sensor group 200 for detecting the motion state of a vessel. As the sensor group 200, a GNSS (Global Navigation Satellite System) for measuring latitude and longitude, which indicate a vessel location, and vessel posture, a magnetic azimuth sensor for measuring the azimuth angle of a hull, an inertial navigation system utilizing a gyroscope and an accelerometer, a measurement device based on a transceiver of another electric wave, a laser beam, or ultrasound, or the like may be utilized.

Specifically, as the sensor group, there is provided a yaw-angle detector 201 that outputs a yaw-angle signal Y indicating a rotation angle around the vertical axis passing through the gravity center of the vessel 300. There is provided a yaw-angular-velocity detector 202 that outputs a yaw-angular-velocity signal YR indicating a rotation angular velocity around the vertical axis passing through the gravity center of the vessel 300. There is provided a rolling-angle detector 203 that outputs a rolling-angle signal R indicating a rotation angle around the anteroposterior-direction axis passing through the gravity center of the vessel 300. There is provided a rolling-angular-velocity detector 204 that outputs a rolling-angular-velocity signal RR indicating a rotation angular velocity around the anteroposterior-direction axis passing through the gravity center of the vessel 300. There is provided a vessel-speed detector 205 that outputs a vessel-speed signal V indicating a vessel speed of the vessel 300. Moreover, there may be provided a steering-angle detector 206 that outputs a steering-angle signal RUA indicating a steering angle of the vessel 300. In this situation, although as the yaw-angular-velocity detector 202 and the rolling-angular-velocity detector 204, respective sensors for detecting the angular velocities may be provided, the respective angular velocities may be calculated from values obtained by applying a time differential to the yaw-angle signal Y, which is the output of the yaw-angle detector 201, and to the rolling-angle signal R, which is the output of the rolling-angle detector 203. The vessel-speed detector 205 can obtain the vessel speed by means of a screw tachometer, a water-surface speed meter, an airspeed meter, an acceleration sensor, a GNSS, a Doppler measurement device based on an electric wave or a laser beam, or the like.

<Hardware Configuration of Electronic Control System>

Figure 2:
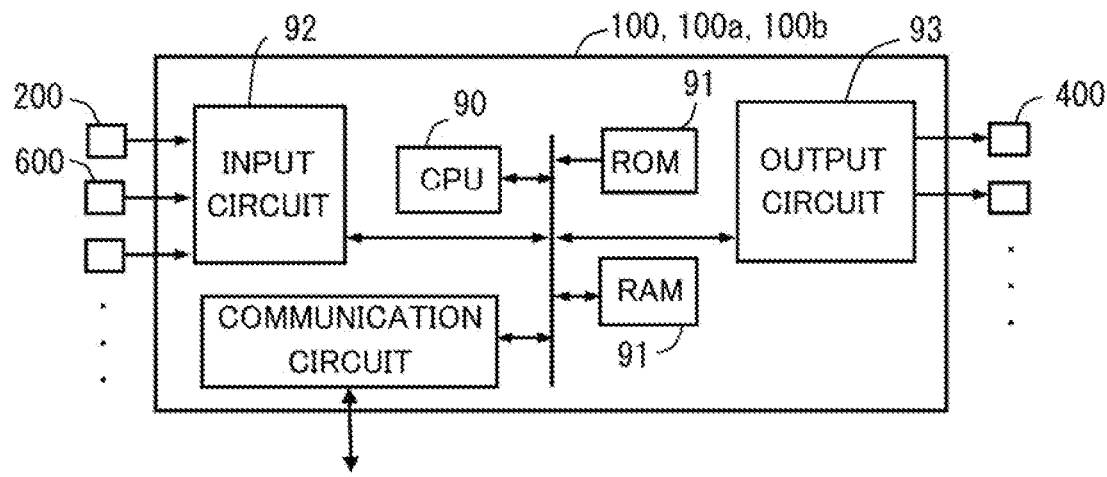
FIG. 2 is a hardware configuration diagram of an electronic control system in the anti-rolling control apparatus according to Embodiment 1.

FIG. 2 is a hardware configuration diagram of the electronic control system 100 in the anti-rolling control apparatus 1. The hardware configuration in FIG. 2 can be applied to each of electronic control systems 100a and 100b. Hereinafter, as the representative, the electronic control system 100 will be explained. In the present embodiment, the electronic control system 100 is to control a vessel anti-rolling control apparatus. Respective functions of the electronic control system 100 are realized by processing circuits provided in the electronic control system 100. Specifically, the electronic control system 100 includes, as the processing circuits, a computing processing unit (computer) 90 such as a CPU (Central Processing Unit), storage apparatuses 91 that exchange data with the computing processing unit 90, an input circuit 92 that inputs external signals to the computing processing unit 90, an output circuit 93 that outputs signals from the computing processing unit 90 to the outside, and the like.

It may be allowed that as the computing processing unit 90, an ASIC (Application Specific Integrated Circuit), an IC (Integrated Circuit), a DSP (Digital Signal Processor), an FPGA (Field Programmable Gate Array), each of various kinds of logic circuits, each of various kinds of signal processing circuits, or the like is provided. In addition, it may be allowed that as the computing processing unit 90, two or more computing processing units of the same type or different types are provided and respective processing items are executed in a sharing manner. As the storage apparatuses 91, there are provided a RAM (Random Access Memory) that can read data from and write data in the computing processing unit 90, a ROM (Read Only Memory) that can read data from the computing processing unit 90, and the like. As the storage apparatus 91, a nonvolatile or volatile semiconductor memory such as a flash memory, an EPROM, or an EEPROM, a magnetic disk, a flexible disk, an optical disk, a compact disk, a minidisk, a DVD, or the like may be utilized. The input circuit 92 is connected with various kinds of sensors including the sensor group 200 and the output signal of the user interface 600, switches, and communication lines, and is provided with an A/D converter, a communication circuit, and the like for inputting output signals from these sensors and switches and communication information to the computing processing unit 90. The output circuit 93 is provided with a driving circuit and the like for outputting control signals from the computing processing unit 90 to driving apparatuses including the steering-angle driving unit 400.

The computing processing unit 90 executes software items (programs) stored in the storage apparatus 91 such as a ROM and collaborates with other hardware devices in the electronic control system 100, such as the storage apparatus 91, the input circuit 92, and the output circuit 93, so that the respective functions provided in the electronic control system 100 are realized. Setting data items such as a threshold value and a determination value to be utilized in the electronic control system 100 are stored, as part of software items (programs), in the storage apparatus 91 such as a ROM. It may be allowed that the respective functions included in the electronic control system 100 are configured with either software modules or combinations of software and hardware.

<Coordinate System, Yaw Angle, and Rolling Angle>

Figure 3:
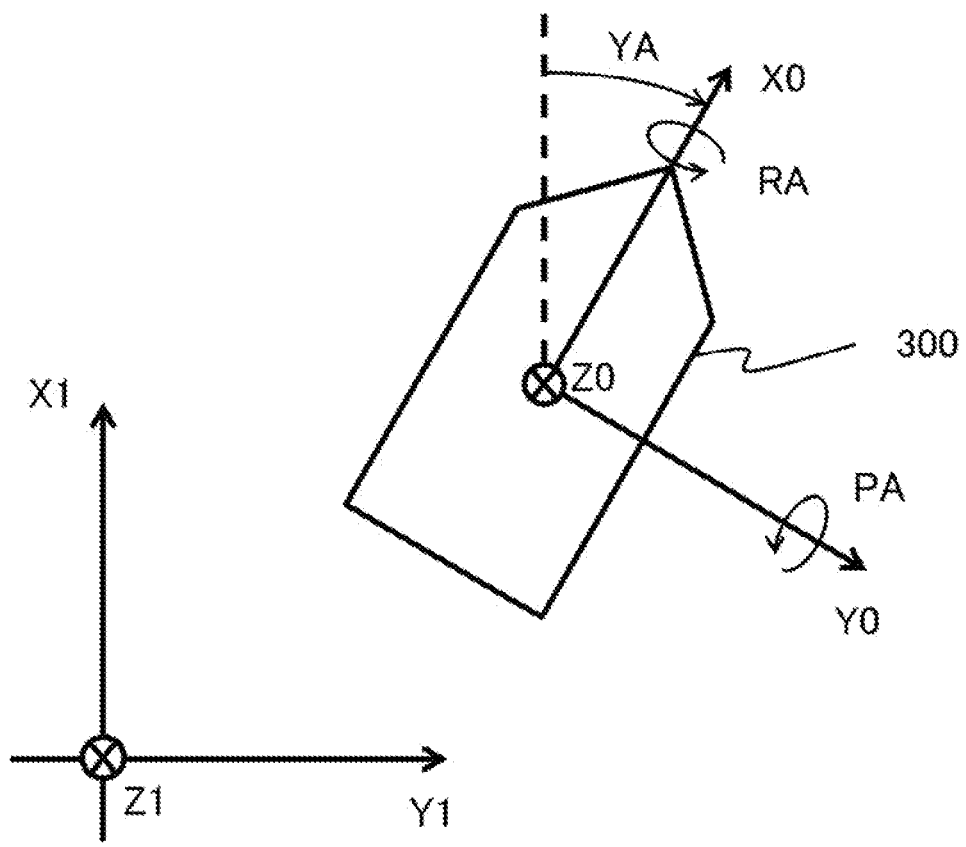
FIG. 3 is an explanatory chart of a coordinate system of a vessel in which the anti-rolling control apparatus according to Embodiment 1 is provided.

FIG. 3 is an explanatory chart of a coordinate system of a vessel in which the anti-rolling control apparatus 1 according to Embodiment 1 is provided. A coordinate system X1-Y1-Z1 is the one whose reference is a fixed point on the ground that is 0 m above sea level or on the water surface. A coordinate system X0-Y0-Z0 is the one whose reference is the hull of the vessel. Each of these coordinate systems is a right-handed system. Because located on the surface of the earth, the position of a vessel sailing on the sea of the earth or on the water surface of a river or a lake undergoes the effect of the spherical earth. However, when the distance between the vessel 300 and the fixed point on the ground that is 0 m above sea level or on the water is small, the situation can be considered in a simplified manner by assuming that both the fixed point and the vessel 300 are on one and the same plane.

In the coordinate system X1-Y1-Z1 whose reference is a fixed point on the ground that is 0 m above sea level or on the water, X1 denotes the north-south direction (the arrow indicates the north); Y1 denotes the east-west direction (the arrow indicates the east). Z1 denotes the vertical direction (the arrow indicates the bottom). The vessel 300 is located on the X1-Y1 plane; in the coordinate system X0-Y0-Z0 whose reference is the hull, X0 denotes the anteroposterior direction passing through the gravity center of the hull (the arrow indicates the front, i.e., the bow direction); Y0 denotes the left-and-right direction passing through the gravity center of the hull (the arrow indicates the right, i.e., the starboard direction); Z0 denotes the hull-structure vertical direction passing through the gravity center of the hull (the arrow indicates the bottom).

On the water, there occurs a rolling motion in which a vessel rotates on the anteroposterior-direction axis passing through the gravity center of the hull. This rolling motion will be referred to as rolling. A rolling angle RA is a rotation angle around the X0 axis; a rolling-angle acceleration (rolling rate) is a rotation angular velocity around the X0 axis. A yaw angle YA (referred to also as an azimuth angle) is a rotation angle around the Z0 axis; a yaw angular velocity (yaw rate) is a rotation angular velocity around the Z0 axis. In addition, a pitching angle PA is a rotation angle around the Y0 axis; a pitching angular velocity (pitching rate) is a rotation angular velocity around the Y0 axis. Depending on the pitching angle of a vessel, the traveling azimuth (axial-front direction) of the vessel deviates from a horizontal plane perpendicular to gravity; however, in this explanation, it will be defined that the yaw-angle signal Y is a signal indicating the traveling azimuth of a vessel on a horizontal plane perpendicular to gravity. On the water, there occurs a rolling motion in which a vessel rotates on the anteroposterior-direction axis passing through the gravity center of the hull. This rolling motion will be referred to as rolling. A rolling angle RA is a rotation angle around the X0 axis; a rolling-angle acceleration (rolling rate) is a rotation angular velocity around the X0 axis. A yaw angle YA (referred to also as an azimuth angle) is a rotation angle around the Z0 axis; a yaw angular velocity (yaw rate) is a rotation angular velocity around the Z0 axis. In addition, a pitching angle PA is a rotation angle around the Y0 axis; a pitching angular velocity (pitching rate) is a rotation angular velocity around the Y0 axis. Depending on the pitching angle of a vessel, the traveling azimuth (axial-front direction) of the vessel deviates from a horizontal plane perpendicular to gravity; however, in this explanation, it will be defined that the yaw-angle signal Y is a signal indicating the traveling azimuth of a vessel on a horizontal plane perpendicular to gravity.

In the case where the azimuth to which the vessel should travel is instructed by the user interface 600, the azimuth information DI is indicated with respect to the X1 direction (the north, in FIG. 2) in the coordinate system X1-Y1-Z1 whose reference is a fixed point on the ground that is 0 m above sea level or on the water. The direction of the hull of the vessel 300 is indicated with a yaw angle with respect to the X1 direction. For example, in the case where it is instructed that the vessel should travel in the northeast, the vessel is operated in such a way as to maintain the yaw angle YA of 45° clockwise with respect to the north, which is the X1 direction.

In the case where the distance between the vessel 300 and the fixed point on the ground that is 0 m above sea level or on the water is large, it cannot simply be considered that both the fixed point and the vessel 300 are on one and the same plane; thus, it is required to make calculation while taking it into consideration that the earth is a sphere. Also in this case, the vessel is operated in such a way as to maintain the yaw angle instructed with respect to the north on the water surface on which the vessel is located.

<Function of Azimuth Commander>

The respective functions of the electronic control system 100, the azimuth commander 10, the azimuth controller 20, the anti-rolling controller 50, and the steering-angle controller 30 represented in FIG. 1 will be explained. The azimuth commander 10 receives the azimuth information DI that is outputted by the user interface 600 in response to operation by a vessel operator. When the azimuth information DI largely changes during a short interval, an azimuth command signal DC obtained by applying specific processing to the azimuth information DI is outputted. In the specific processing, for example, a low-pass filter, a moving-average filter, a band-pass filter, or the like can be utilized.

<Function of Azimuth Controller>

The azimuth controller 20 receives the azimuth command signal DC, which is the output of the azimuth commander 10, and sensor-group information, which is the output of the sensor group 200, and then outputs the first steering-angle command value RUAC1 so as to perform azimuth control in which the vessel is controlled so as to be directed to an instructed azimuth. It may be allowed that the azimuth controller 20 receives the yaw-angular-velocity signal YR, which is the output of the yaw-angular-velocity detector 202, and the steering-angle signal RUA, which is the output of the steering-angle detector 206, in addition to the yaw-angle signal Y, which is the output of the yaw-angle detector 201, and the vessel-speed signal V, which is the output of the vessel-speed detector 205.

The azimuth controller 20 executes azimuth feedback control so that a yaw-angle error dY between the azimuth command signal DC and the yaw-angle signal Y indicating a real azimuth is made zero, and then outputs the first steering-angle command value RUAC1. In this situation, it may be allowed that the azimuth controller 20 recognizes the present steering angle from the steering-angle signal RUA, determines how much the steering angle should be changed, and then outputs the first steering-angle command value RUAC1.

The azimuth controller 20 can limit the changing amount of the first steering-angle command value RUAC1 per unit time, in accordance with the vessel-speed signal V. The reason for that is as follows: in the case where when the vessel-speed signal V is large, the steering-angle control command value RUAC is suddenly changed by suddenly changing the first steering-angle command value RUAC1, the traveling azimuth (yaw-angle signal Y) of the vessel is excessively controlled; therefore, when the motion of the vessel 300 becomes unstable, rolling becomes violent and hence the riding comfort may be deteriorated.

Furthermore, it may be allowed that the azimuth controller 20 obtains a yaw-angular-velocity command signal YRC, based on the foregoing yaw-angle error dY (YRC is unillustrated). The azimuth controller 20 receives the yaw-angle error dY and can obtain the yaw-angular-velocity command signal YRC, as the output obtained by processing the yaw-angle error dY with an appropriate controller or function. It may also be allowed that the inner loop of the foregoing azimuth feedback control includes yaw-angular-velocity feedback control in which a yaw-angular-velocity error dYR, which is the error between the yaw-angular-velocity command signal YRC and the yaw-angular-velocity signal YR, is made zero. The reason for that is because the yaw-angular-velocity command signal YRC makes it possible that the turning speed of the vessel is appropriately controlled and hence the riding comfort and the rolling condition are appropriately controlled. As the controller for each of the azimuth feedback control and the yaw-angular-velocity feedback control, a publicly known PID (Proportional Integral differential) controller or the like can be utilized.

<Anti-Rolling Controller>

The anti-rolling controller 50 receives the sensor-group information, which is the output of the sensor group 200 and then outputs the second steering-angle command value RUAC2 in order to perform anti-rolling control for reducing rolling of the vessel 300. The anti-rolling controller 50 receives the rolling-angle signal R, which is the output of the rolling-angle detector 203, the rolling-angular-velocity signal RR, which is the output of the rolling-angular-velocity detector 204, and the vessel-speed signal V, which is the output of the vessel-speed detector 205. Moreover, it may be allowed that anti-rolling controller 50 receives the steering-angle signal RUA, which is the output of the steering-angle detector 206.

In general, as far as a vessel is concerned, the gravity center of the vessel and the center of force exerted on the rudder do not coincide with each other. Accordingly, at a time of steering, there occurs a rotary moment around the X0 axis, which is proportional to the distance between the gravity center of the vessel and the center of force exerted on the rudder. That is to say, the motion of the vessel caused by steering excites not only simple rotary motion around the Z0 axis but also rotary motion around the X0 axis.

<Rolling Caused by Change in Steering Angle>

Figure 4:
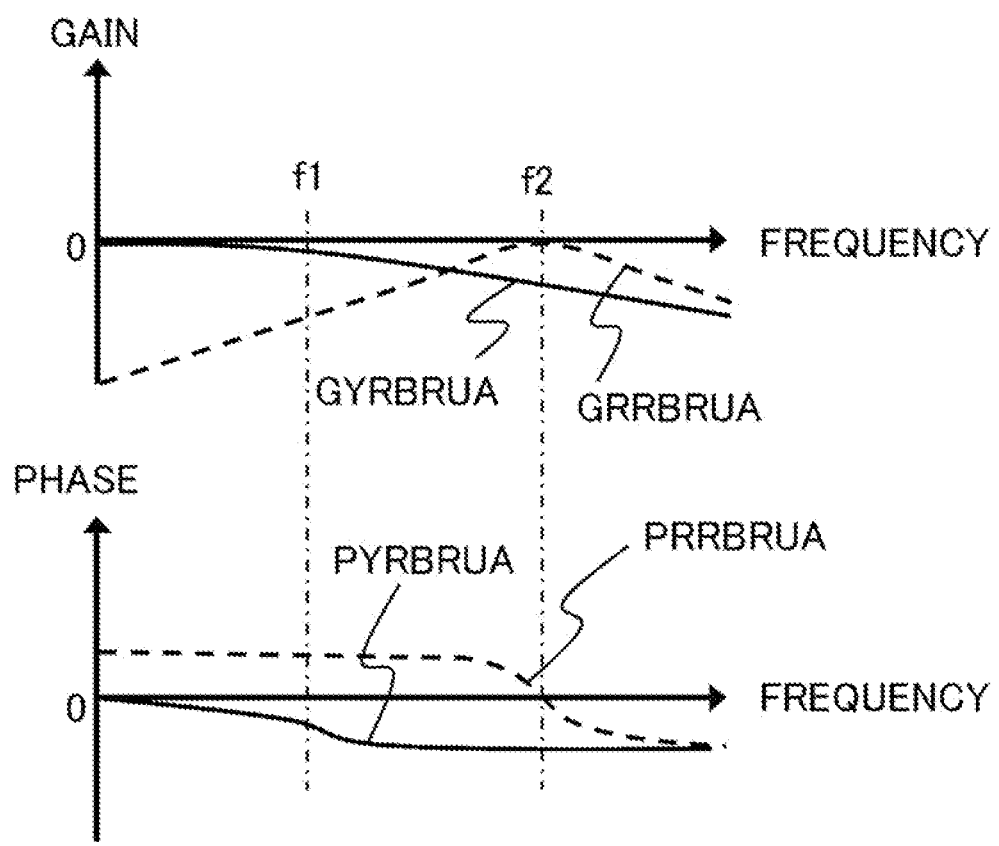
FIG. 4 is a set of graphs representing the respective frequency responses of the yaw angular velocity and the rolling angular velocity vs. the steering angle in the anti-rolling control apparatus according to Embodiment 1.

FIG. 4 represents the respective frequency responses of the yaw-angular-velocity signal YR and the rolling-angular-velocity signal RR vs. the steering angle, with regard to the gains and the phases thereof, in the anti-rolling control apparatus 1 according to Embodiment 1. Speaking in detail, the frequency responses have been obtained through the following procedure.

There have been recorded the steering-angle signal RUA, the yaw-angular-velocity signal YR, and the rolling-angular-velocity signal RR at a time when the steering-angle control command value RUAC having a sine-wave shape is applied to the steering-angle driving unit 400, while the frequency thereof is swept. FIG. 4 represents the result of arrangement of the yaw-angular-velocity signal YR vs. the steering-angle signal RUA and the rolling-angular-velocity signal RR vs. steering-angle signal RUA, with regard to the gains and the phases thereof. FIG. 4 represents actual frequency response characteristics of the vessel 300 in a low-speed zone. The respective solid lines in FIG. 4 represent, as GYRBRUA, the gain of the yaw-angular-velocity signal YR vs. the change in the steering-angle signal RUA and, as PYRBRUA, the phase of the yaw-angular-velocity signal YR vs. the change in the steering-angle signal RUA. The respective broken lines represent, as GRRBRUA, the gain of the rolling-angular-velocity signal RR vs. the change in the steering-angle signal RUA and, as PRRBRUA, the phase of the rolling-angular-velocity signal RR vs. the change in the steering-angle signal RUA.

The gain GYRBRUA of the yaw-angular-velocity signal YR vs. the steering-angle signal RUA, which is represented by the solid line, is characterized by being substantially flat in a low-frequency zone and by falling as the frequency rises. By use of a response frequency f1, this characteristic can be represented by a first-order lag system or the like, In contrast, the gain GRRBRUA of the rolling-angular-velocity signal RR vs. the steering-angle signal RUA, which is represented by the broken line, has a differential characteristic and a peak gain in a low-frequency zone. The rolling-angular-velocity signal RR has a unique characteristic that after and including a peak-gain frequency (hereinafter, referred to also as a peak frequency) f2, a steep phase delay occurs in the phase PRRBRUA thereof vs. the steering-angle signal RUA.

When the vessel 300 is steered, the response of the rolling-angular-velocity signal RR is faster than that of the yaw-angular-velocity signal YR, and the phase of the rolling-angular-velocity signal RR is more advanced than that of the yaw-angular-velocity signal YR. Accordingly, even when among the sensor-group information pieces, which are the outputs of the sensor group 200, the yaw-angle signal Y, which is an actual azimuth, is inputted to the azimuth controller 20 so that there is performed azimuth feedback control in which the error between the yaw-angle signal Y and the azimuth command signal DC, which is the output of the azimuth commander 10, is made zero, there cannot substantially be created any steering-angle command value for reducing rolling caused by the rolling angle RA around a rolling axis (the anteroposterior-direction axis X0 of the hull). Moreover, similarly, even a double-loop configuration having yaw-angular-velocity feedback control in the inner loop of the foregoing azimuth feedback control cannot substantially create any steering-angle command value for reducing rolling around the rolling axis.

<Function of Anti-Rolling Controller>

Figure 5:
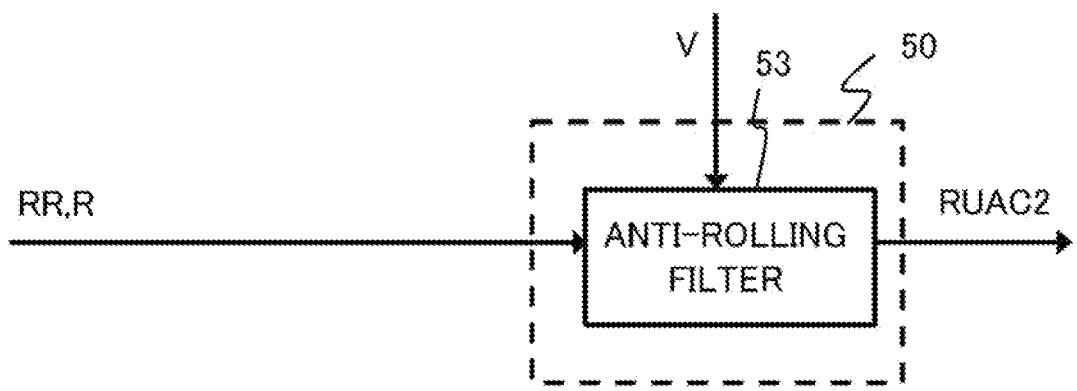
FIG. 5 is a block diagram representing an anti-rolling controller of the anti-rolling control apparatus according to Embodiment 1.

FIG. 5 is a block diagram representing the anti-rolling controller 50 of the anti-rolling control apparatus 1 according to Embodiment 1. The anti-rolling controller 50 has an anti-rolling filter 53 for receiving the rolling-angular-velocity signal RR, the rolling-angle signal R, and the vessel-speed signal V, which are part of sensor-group information that is the output of the sensor group 200, and then outputting the second steering-angle command value RUAC2. The anti-rolling filter 53 is a filter formed based on the rolling-angular-velocity signal RR, the rolling-angle signal R, and the vessel-speed signal V and according to the frequency response characteristic represented by the broken line in FIG. 4, and outputs the second steering-angle command value RUAC2.

When the anti-rolling filter 53 is formed, the basic equation for the frequency transfer function of the rolling-angular-velocity signal RR vs. the steering-angle signal RUA, represented in FIG. 4, is expressed by the equation (1).

$$G_{roll}(s) = \frac{K_{roll}\omega_{n,roll}^2 s}{s^2 + 2\zeta_{roll}\omega_{n,roll}s + \omega_{n,roll}^2} \quad (1)$$

The symbols in the equation (1) are defined as follows:
- $G_{roll}$: the transfer function of an actual rolling rate vs. the real steering angle
- $K_{roll}$: the gain
- $\zeta_{roll}$: the attenuation ratio of rolling motion
- $\omega_{n,roll}$: the inherent vibration frequency of rolling motion The second-order transfer function given by the equation (1) is an example; another formula, i.e., a higher-order transfer function may be utilized as long as it is a transfer function that can approximate the frequency response characteristic including the peak frequency f2 indicated in the broken line in FIG. 4.

Furthermore, considering the fact that in the transfer function according to the equation (1), the value of the peak gain or the like changes with the vessel speed, the foregoing basic equation can also be expressed by the equation (2) in which the parameters in the frequency transfer function given by the equation (1) are replaced by functions of the vessel speed.

$$G_{roll}(s) = \frac{K_{roll}(V)\omega_{n,roll}^2(V)s}{s^2 + 2\zeta_{roll}(V)\omega_{n,roll}(V)s + \omega_{n,roll}^2(V)} \quad (2)$$

V is the vessel speed and is a parameter included in the transfer function.

Each of $K_{roll}(V)$, $\zeta_{roll}(V)$, and $\omega_{n,roll}(V)$ is a function of the vessel speed V.

Under the foregoing preparation, the anti-rolling filter 53 is given as a so-called inverse model in which the numerator and the denominator of the equation (1) or (2) are replaced by each other. This configuration makes it possible to create a steering-angle command value for realizing the rolling-angular-velocity signal RR and the rolling-angle signal R. In other words, it can be presumed that rolling around the rolling axis, which poses a sailing problem, is excited by the foregoing steering-angle command. Therefore, the steering-angle command for reducing the rolling, i.e., the second steering-angle command value RUAC2 can be obtained by multiplying the foregoing steering-angle command by "−1".

$K_{roll}(V)$, $\zeta_{roll}(V)$, and $\omega_{n,roll}(V)$, which are the parameters of the anti-rolling filter 53, can be obtained through the following procedure. At first, during sailing at a constant vessel speed, the actually measured value of the frequency response characteristic of the rolling angular velocity vs. the steering angle is obtained by frequency-sweeping the sine-wave steering-angle command value. This measurement is performed at each vessel speed. Next, curve fitting is applied to these actually measured values, so that each of the parameter of the anti-rolling filter 53 can be set, as a function of the vessel speed or a map for the vessel speed. The anti-rolling controller 50 is configured in such a manner as described above, so that the second steering-angle command value RUAC2 for reducing rolling can be created through a simple calculation, while being made to correspond to a change in the dynamic characteristic of the vessel-speed signal V-dependent rolling motion of the vessel 300.

<Function of Steering-Angle Controller>

Figure 6:
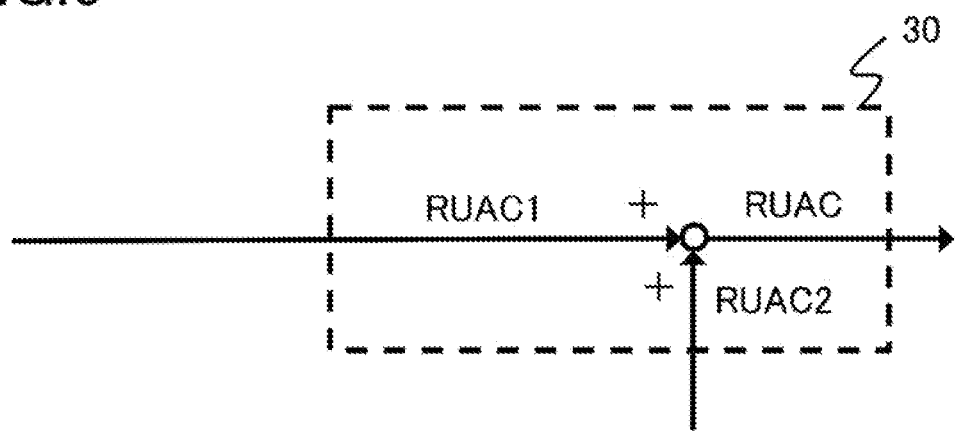
FIG. 6 is a block diagram representing a steering-angle controller of the anti-rolling control apparatus according to Embodiment 1.

FIG. 6 is a block diagram representing the steering-angle controller 30 of the anti-rolling control apparatus 1 according to Embodiment 1. The steering-angle controller 30 outputs, as the steering-angle control command value RUAC, the sum of the first steering-angle command value RUAC1, which is the output of the azimuth controller 20, and the second steering-angle command value RUAC2, which is the output of the anti-rolling controller 50 to the steering-angle driving unit 400.

<Tuning of Anti-Rolling Controller>

Figure 7:
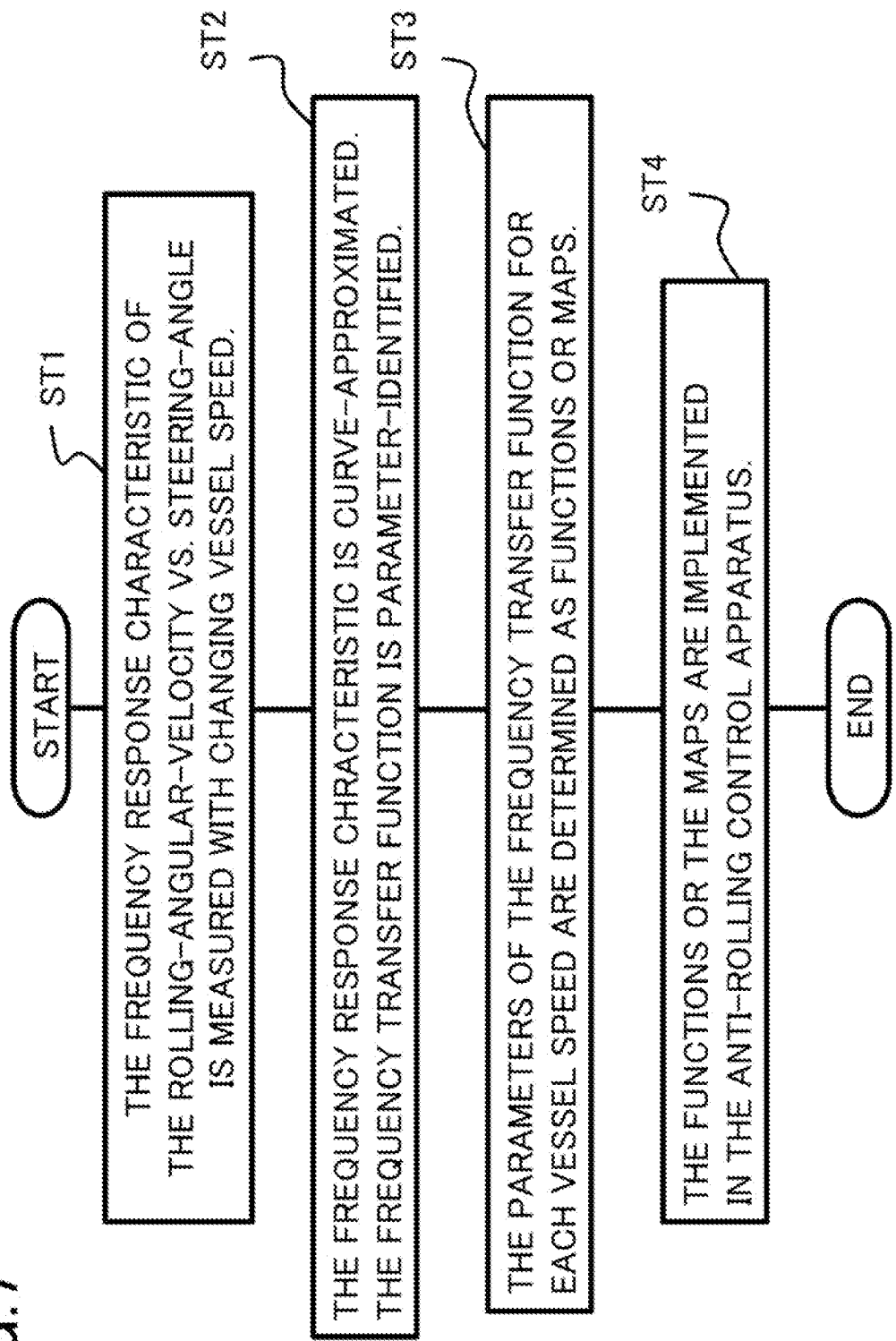
FIG. 7 is a flowchart of tuning of the anti-rolling controller in the anti-rolling control apparatus according to Embodiment 1.

FIG. 7 is a flowchart of tuning of the anti-rolling controller 50 in the anti-rolling control apparatus according to Embodiment 1. With regard to the vessel 300, data on the frequency response of the rolling-angular-velocity signal RR vs. the steering-angle signal RUA is obtained. The parameters of the transfer function for the anti-rolling controller 50 are set from the obtained data. Software in which the parameters are set is implemented in the electronic control system 100. FIG. 7 explains these procedures.

An operator can execute the procedure from collection of the data to implementation of the software by manipulating tools. However, it may be allowed that the electronic control system 100 executes this procedure in response to a tuning command. Moreover, it may be allowed that the electronic control system 100 executes this procedure periodically or when it is determined that an error has become large.

The flowchart in FIG. 7 is executed each time the tuning of the anti-rolling controller 50 is implemented. After the execution is started, in the step ST1, a sine-wave steering-angle command, as the steering-angle control command value RUAC, is provided while being frequency-swept during sailing at a constant vessel speed, and the frequency response characteristic of the rolling-angular-velocity signal RR vs. steering-angle signal RUA at this time is preliminarily measured. This measurement is executed while vessel speed is changed.

In the step ST2, the frequency response characteristic of the rolling-angular-velocity signal RR vs. steering-angle signal RUA, which has been measured in the step ST1, is curve-approximated offline. Then, from this approximation curve, the frequency transfer function is parameter-identified at each vessel speed. It may be allowed that the curve approximation and parameter identification are implemented online by the anti-rolling control apparatus 1 or by an external apparatus connected by means of communication.

In the step ST3, the parameters of the frequency transfer function for each vessel speed, obtained in the step ST2, are determined as the functions or maps of the vessel speed. In the step ST4, the software related to the anti-rolling controller 50 is implemented in the electronic control system 100.

As described above, the anti-rolling control apparatus 1 according to Embodiment 1 has the azimuth commander 10 that generates the azimuth command signal DC indicating the azimuth to which the vessel 300 should travel. In addition, the anti-rolling control apparatus 1 has the yaw-angle detector 201 that outputs the yaw-angle signal Y of the vessel 300, the rolling-angle detector 203 that outputs the rolling-angle signal R, the rolling-angular-velocity detector 204 that outputs the rolling-angular-velocity signal RR, and the vessel-speed detector 205 that outputs the vessel-speed signal V.

Moreover, the anti-rolling control apparatus 1 has the azimuth controller 20 that outputs the first steering-angle command value RUAC1 for making the vessel 300 turn to the azimuth to which it should travel, based on the azimuth command signal DC and the yaw-angle signal Y. In addition, the anti-rolling control apparatus 1 has the anti-rolling controller 50 that outputs the second steering-angle command value RUAC2 for reducing rolling of the vessel 300, based on the rolling-angle signal R, the rolling-angular-velocity signal RR, and the vessel-speed signal V.

The anti-rolling control apparatus 1 has the steering-angle controller 30 that controls the steering angle, based on the first steering-angle command value RUAC1 and the second steering-angle command value RUAC2. Accordingly, there can be realized a series of operation items in which rolling around the rolling axis is reduced by the second steering-angle command value RUAC2 corresponding to vessel speed and in which the vessel is controlled so as to turn to the azimuth instructed by the first steering-angle command value RUAC1.

These processing items can be performed by simple calculations. Accordingly, a vessel anti-rolling control apparatus and an anti-rolling control method can be realized without requiring a large memory capacity and a high-speed high-function computing processing unit; thus, the cost hike of the anti-rolling control apparatus 1 can be suppressed. In addition, the amount of computing processing can be prevented from becoming excessive. Accordingly, it can also be prevented that because when calculation is not completed in a short period, construction of the model becomes insufficient, the control gain is determined by use of the model based on an erroneous correlation coefficient matrix and hence the control system becomes unstable.

The anti-rolling control method for the vessel 300 according to Embodiment 1 has a step in which the azimuth commander 10 generates the azimuth command signal DC indicating the azimuth to which the vessel 300 should travel. In addition, the anti-rolling control method has a step in which the yaw-angle detector 201 outputs the yaw-angle signal Y, a step in which the rolling-angle detector 203 outputs the rolling-angle signal R, a step in which the rolling-angular-velocity detector 204 outputs the rolling-angular-velocity signal RR, and a step in which the vessel-speed detector 205 outputs the vessel-speed signal V.

Furthermore, the anti-rolling control method has
a step in which the azimuth controller 20 outputs the first steering-angle command value RUAC1 for making the vessel turn to the azimuth to which it should travel, in accordance with the yaw-angle error dY, which is an error between the azimuth command signal DC and the yaw-angle signal Y,
a step in which the anti-rolling controller 50 outputs the second steering-angle command value RUAC2 for reducing rolling of the vessel, based on the rolling-angle signal R, the rolling-angular-velocity signal RR, and the vessel-speed signal V, and
a step in which the steering-angle controller 30 controls the steering angle, based on the first steering-angle command value RUAC1 and the second steering-angle command value RUAC2.

This method makes it possible to realize a series of operation items in which rolling around the rolling axis is reduced by the second steering-angle command value RUAC2 corresponding to the vessel speed and in which the vessel is controlled so as to turn to the azimuth instructed by the first steering-angle command value RUAC1. Because these processing items can be performed by simple calculations, the cost hike can be suppressed.

2. Embodiment 2

Figure 8:
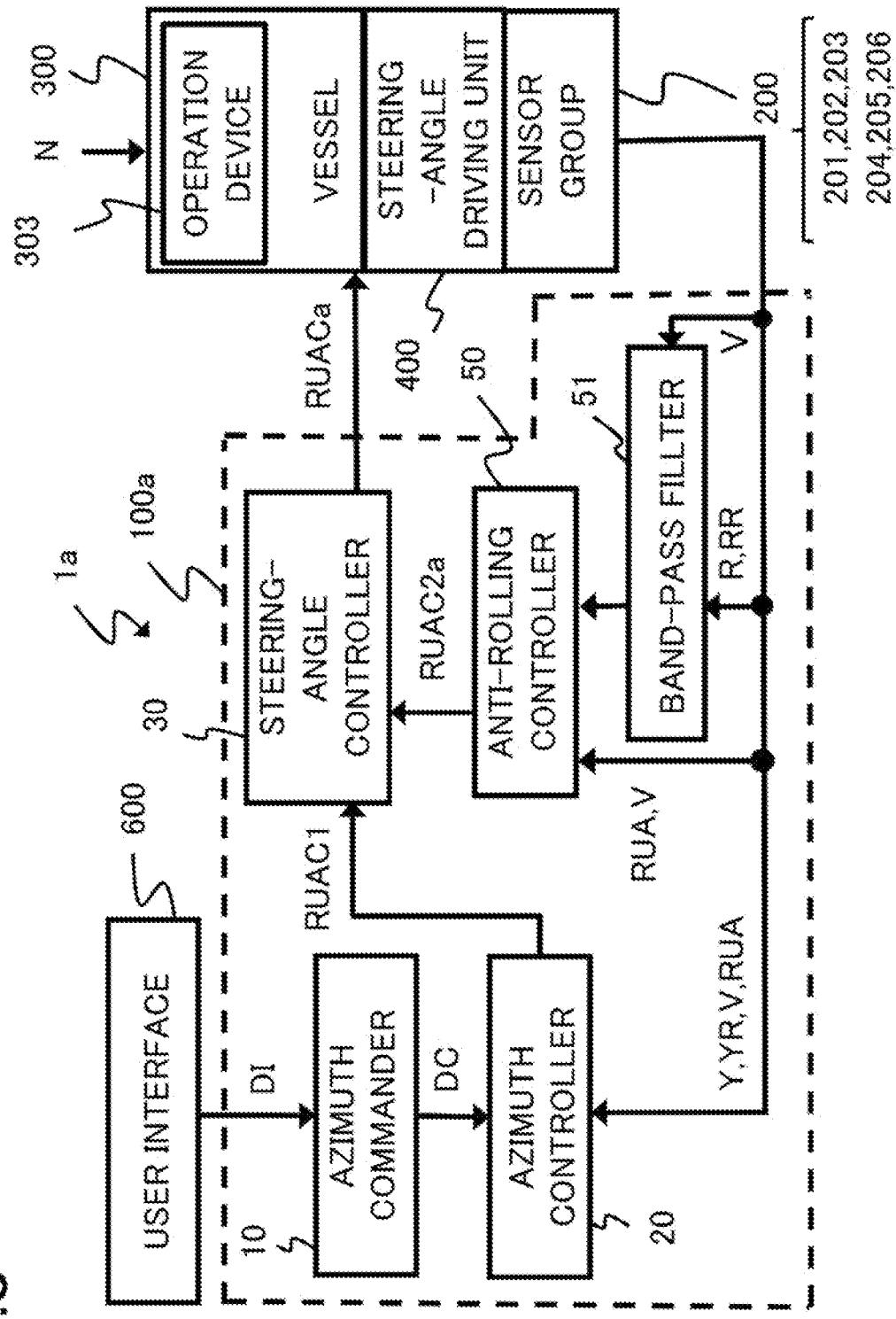
FIG. 8 is a configuration diagram of an anti-rolling control apparatus according to Embodiment 2.

FIG. 8 is a configuration diagram of an anti-rolling control apparatus 1a according to Embodiment 2. The anti-rolling control apparatus 1a is different from the anti-rolling control apparatus 1 according to Embodiment 1, represented in FIG. 1, in that the anti-rolling controller 50 of the electronic control system 100a receives the rolling-angle signal R and the rolling-angular-velocity signal RR by way of a band-pass filter 51. Accordingly, a second steering-angle command value RUAC2a outputted by the anti-rolling controller 50 is inputted to the steering-angle controller 30; then, the steering-angle controller 30 outputs a steering-angle control command value RUACa.

<Band-Pass Filter>

The band-pass filter 51 is a filter for extracting only the signal in the vicinity of the peak frequency f2 represented in FIG. 4 from each of the rolling-angle signal R and the rolling-angular-velocity signal RR. As the band-pass filter 51, a band-pass filter, a combination of a high-pass filter and a low-pass filter, or the like can be utilized. The rolling-angle signal R and the rolling-angular-velocity signal RR that have passed through the band-pass filter 51 are processed in the anti-rolling controller 50. Usage of the band-pass filter 51 makes it possible to perform anti-rolling control while eliminating the effect of the disturbance N.

Figure 9:
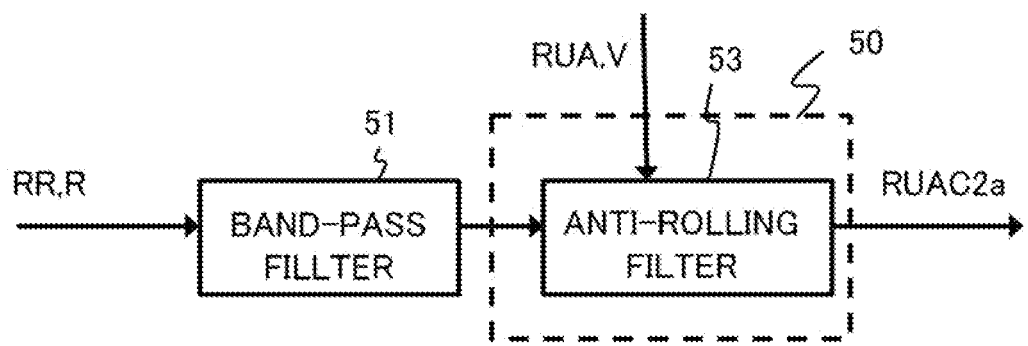
FIG. 9 is a block diagram representing an anti-rolling controller and a band-pass filter of the anti-rolling control apparatus according to Embodiment 2.

FIG. 9 is a block diagram representing the anti-rolling controller 50 and the band-pass filter 51 of the anti-rolling control apparatus 1a according to Embodiment 2. The anti-rolling filter 53 of the anti-rolling controller 50 is a filter configured based on the frequency response characteristic represented by the broken line in FIG. 4. The anti-rolling filter 53 outputs the second steering-angle command value RUAC2a, based on the vessel-speed signal V, which is the output of the vessel-speed detector 205, and the filtered rolling-angular-velocity signal RR and the filtered rolling-angle signal R, which are the outputs of the band-pass filter 51.

<Tuning of Anti-Rolling Controller and Band-Pass Filter>

Figure 10:
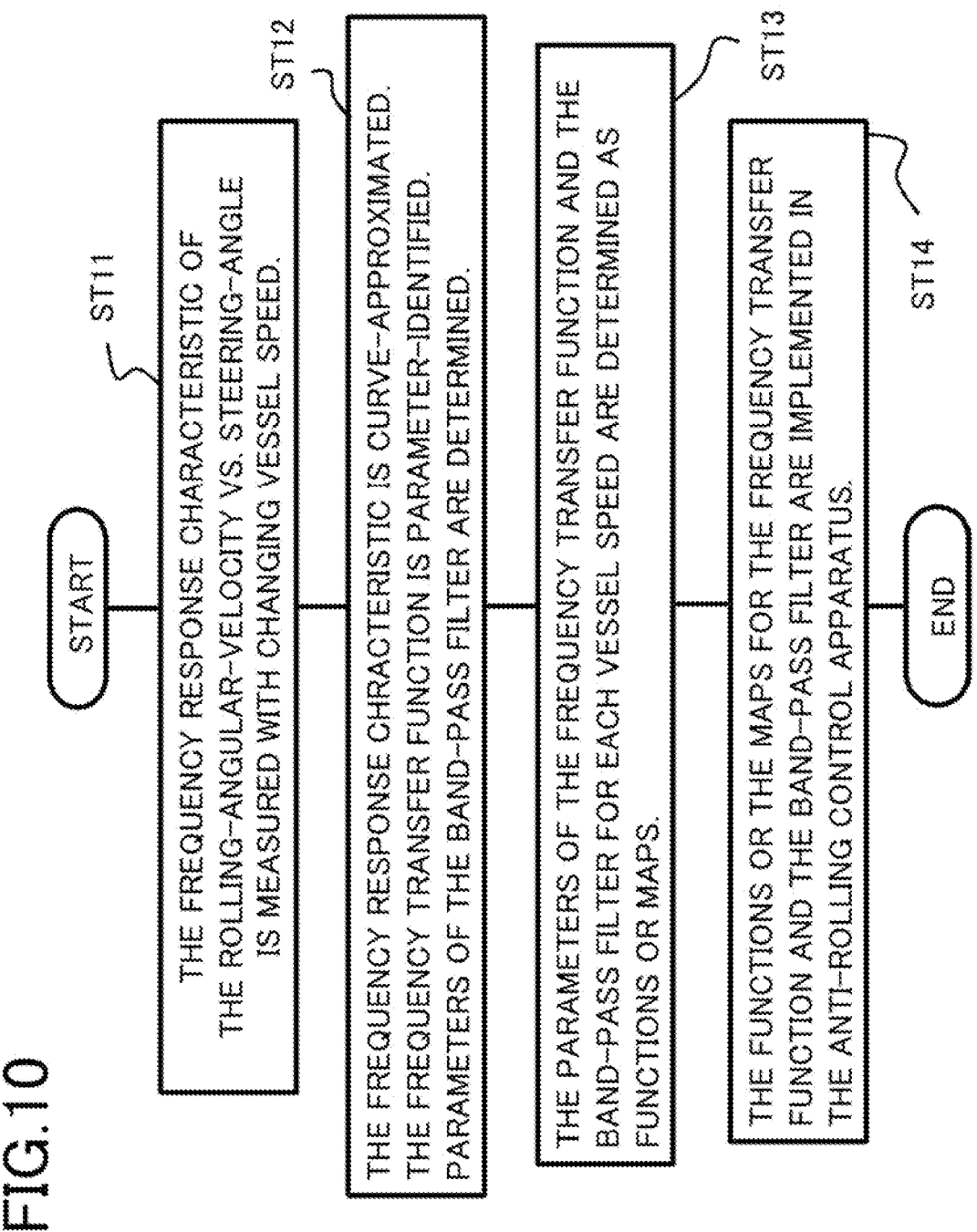
FIG. 10 is a flowchart of tuning of the anti-rolling controller and the band-pass filter in the anti-rolling control apparatus according to Embodiment 2.

FIG. 10 is a flowchart of tuning of the anti-rolling controller 50 and the band-pass filter 51 in the anti-rolling control apparatus 1a according to Embodiment 2. The flowchart is executed each time the tuning of the anti-rolling controller 50 and the band-pass filter 51 is implemented. With regard to the vessel 300, data on the frequency response of the rolling-angular-velocity signal RR vs. the steering-angle signal RUA is obtained. The parameters of the band-pass filter 51 and the parameters of the anti-rolling controller 50 are set from the obtained data. Software in which the parameters are set is implemented in the electronic control system 100a. FIG. 10 explains these procedures.

An operator can execute the procedure from collection of the data to implementation of the software by manipulating tools. However, it may be allowed that the electronic control system 100a executes this procedure in response to a tuning command. Moreover, it may be allowed that the electronic control system 100a executes this procedure periodically or when it is determined that an error has become large.

After the processing in the flowchart of is started, in the step ST11, a sine-wave steering-angle command, as the steering-angle control command value RUAC, is provided while being frequency-swept during sailing at a constant vessel speed, and the frequency response characteristic of the rolling-angular-velocity signal RR vs. steering-angle signal RUA at this time is preliminarily measured. This measurement is executed while the vessel speed is changed.

In the step ST12, the frequency response characteristic of the rolling-angular-velocity signal RR vs. steering-angle signal RUA, which has been measured in the step ST11, is curve-approximated offline. Then, from this approximation curve, the frequency transfer function is parameter-identified at each vessel speed. The passing-frequency bandwidth in the vicinity of the peak gain, which is a parameter of the band-pass filter 51, is determined based on the foregoing frequency transfer function.

In the step ST13, the parameters of the frequency transfer function for each vessel speed and the parameters of the band-pass filter 51, obtained in the step ST12, are determined as the functions or maps of the vessel speed. In the step ST14, the software items related to the anti-rolling controller 50 and the band-pass filter 51 are implemented in the electronic control system 100a.

The band-pass filter 51 permits passage of only the signal in a frequency bandwidth in the vicinity of the frequency at which the gain GRRBRUA of the rolling-angular-velocity signal RR vs. the steering-angle signal RUA takes a peak value, so that the performance of control of the rolling-angular-velocity signal RR through operation of the steering-angle signal RUA can be raised. The band-pass filter 51 can suppress the anti-rolling control from being disturbed by the disturbance N. As a result, more appropriate anti-rolling processing can be realized.

3. Embodiment 3

Figure 11:
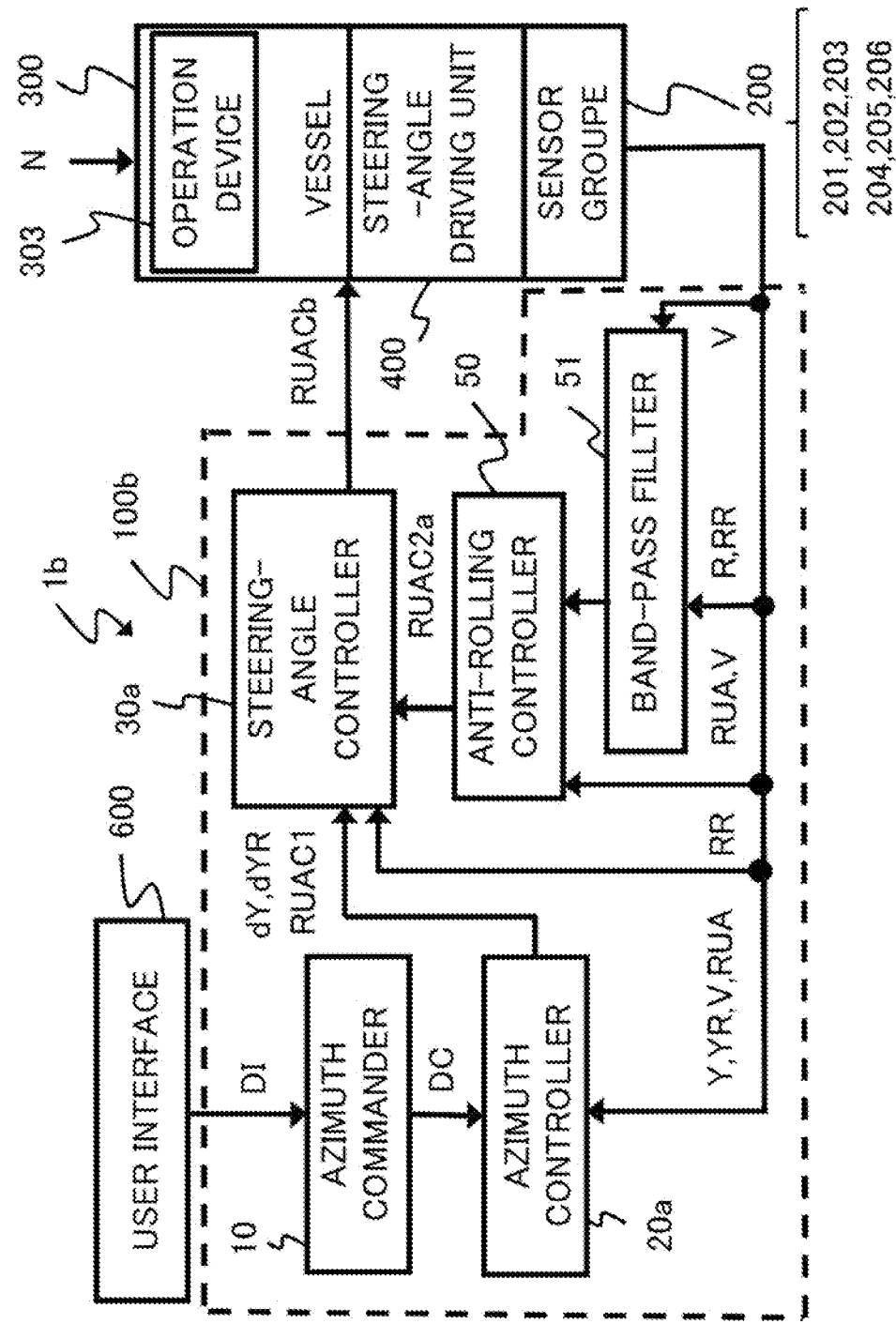
FIG. 11 is a configuration diagram of an anti-rolling control apparatus according to Embodiment 3.

FIG. 11 is a configuration diagram of an anti-rolling control apparatus 1b according to Embodiment 3. The anti-rolling control apparatus 1b is different from the anti-rolling control apparatus 1a according to Embodiment 2, represented in FIG. 8, in that a steering-angle controller 30a of the electronic control system 100b receives the rolling-angular-velocity signal RR, outputted by the rolling-angular-velocity detector 204, and the yaw-angle error dY and the yaw-angular-velocity error dYR that are outputted by an azimuth controller 20a, and then outputs a steering-angle control command value RUACb.

<Distribution of First Steering-Angle Command Value and Second Steering-Angle Command Value>

Figure 12:
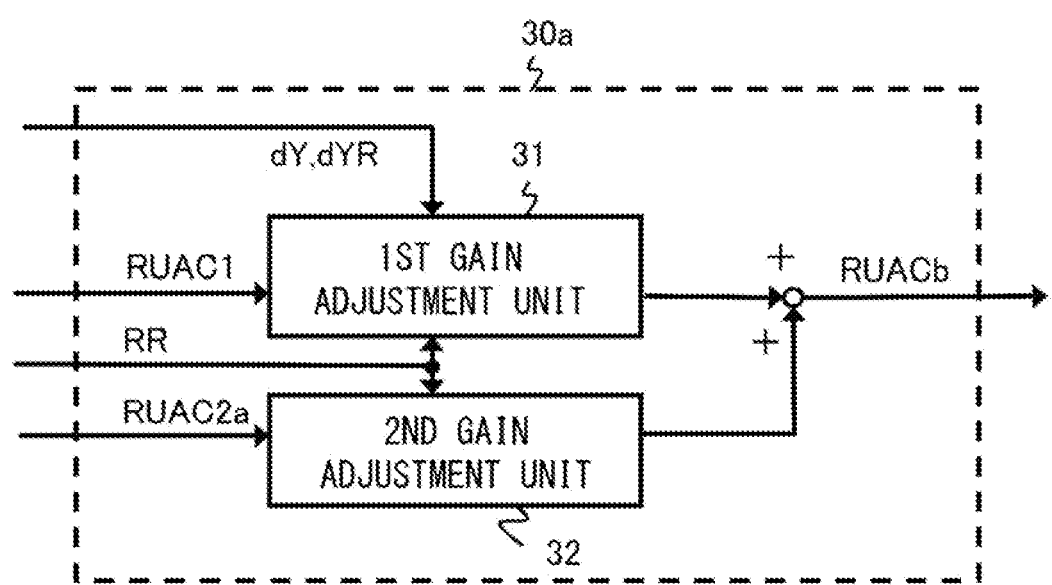
FIG. 12 is a block diagram representing a steering-angle controller of the anti-rolling control apparatus according to Embodiment 3.

FIG. 12 is a block diagram representing the steering-angle controller 30a of the anti-rolling control apparatus 1b according to Embodiment 3. The steering-angle controller 30a outputs the steering-angle control command value RUACb from the sum of a value obtained by multiplying the first steering-angle command value RUAC1 by a first gain G1 in a first gain adjustment unit 31 and a value obtained by multiplying the second steering-angle command value RUAC2a by a second gain G2 in a second gain adjustment unit 32. As a result, the anti-rolling control apparatus 1b controls a steering angle (G1 and G2 are unillustrated).

There will be explained a precondition for realizing an azimuth hold or an azimuth change (hereinafter, an azimuth hold and an azimuth change will collectively be referred to as azimuth control) while reducing rolling of a vessel. In the coordinate system X0-Y0-Z0 whose reference is the hull in FIG. 3, both a yaw-angle rotation around the Z0 axis and a rolling-angle rotation around the X0 axis are excited by steering in the vessel. The respective dynamic characteristics of the both rotations are characterized by the frequency response characteristics represented in FIG. 4.

As the condition for concurrently establishing both the anti-rolling control and the azimuth control in steering, it is important that the response frequency f1 in the frequency response characteristic of the yaw-angular-velocity signal YR vs. the steering angle and the peak frequency f2 of the gain GRRBRUA of the rolling-angular-velocity signal RR in the frequency response characteristic of the rolling-angular-velocity signal RR vs. the steering angle are separated from each other in terms of a numerical value. In other words, it is important that a yaw-angle rotation and a rolling-angle rotation are separated from each other so that both motions do not interfere with each other.

For example, when in order to speed up the response of the azimuth control, the gain of the azimuth controller 20a is increased and the control bandwidth is expanded up to the vicinity of f2, rolling around the roll axis may be induced. Thus, it is required that the control bandwidth of the azimuth controller 20 is set to be under the peak frequency f2 of the gain GRRBRUA of the rolling-angular-velocity signal RR.

It is required that the first steering-angle command value RUAC1 and the second steering-angle command value RUAC2a are appropriately distributed in such a way that the first steering-angle command value RUAC1, which is the output of the azimuth controller 20, contributes only to the azimuth control and that the second steering-angle command value RUAC2a, which is the output of the anti-rolling controller 50, contributes only to the reduction of rolling in a rolling-angle rotation. Moreover, because due to addition of the second steering-angle command value RUAC2a, the frequency of steering-angle operation increases in comparison with steering only with the first steering-angle command value RUAC1, there exists the probability that the riding comfort of the vessel is deteriorated. Accordingly, it is required that the second steering-angle command value RUAC2a is adjusted to the extent not to deteriorate the riding comfort.

In the block diagram in FIG. 12 representing the steering-angle controller 30a, the first gain adjustment unit 31 receives the first steering-angle command value RUAC1, which is the output of the azimuth controller 20a, the yaw-angle error dY, the yaw-angular-velocity error dYR, and the rolling-angular-velocity signal RR, which is the output of the rolling-angular-velocity detector 204. Then, the first gain adjustment unit 31 increases or decreases the amplitude of the first steering-angle command value RUAC1 through the first gain G1 so as to output an adjusted first steering-angle command value. The second gain adjustment unit 32 receives the second steering-angle command value RUAC2a, which is the output of the anti-rolling controller 50, and the rolling-angular-velocity signal RR, which is the output of the rolling-angular-velocity detector 204, and increases or decreases the amplitude of the second steering-angle command value RUAC2a through the second gain G2 so as to output an adjusted second steering-angle command value RUAC2a.

<Specific Example of Gain Adjustment>

The respective specific examples of gain adjustment in the first gain adjustment unit 31 and the second gain adjustment unit 32 will be explained. When during an initial sailing period, the azimuth of the vessel is held, for example, by setting the azimuth command signal to be constant, the anti-rolling control apparatus 1b performs steering-angle control under the condition that the second gain G2 of the second gain adjustment unit 32 is "0" and the first gain G1 of the first gain adjustment unit 31 is "1". Because the control bandwidth of the azimuth control is appropriately designed so as to be under f2, only the azimuth control is performed under the condition that the first gain G1 of the first gain adjustment unit 31 is "1".

In this situation, when the rolling-angular-velocity signal RR is the same as or larger than a predetermined fourth threshold value for allowable riding comfort, it is determined that rolling is large; then, in order to suppress the rolling, the second gain G2 of the second gain adjustment unit 32 is set to "1" and the second steering-angle command value RUAC2a is added to the first steering-angle command value RUAC1. In contrast, when the rolling-angular-velocity signal RR is smaller than the fourth threshold value for allowable riding comfort, the second gain G2 of the second gain adjustment unit 32 is set to "0" and the second steering-angle command value RUAC2a is not added to the first steering-angle command value RUAC1. A hysteresis may be provided in the fourth threshold value.

The foregoing method makes it possible that in accordance with the result of comparison between the rolling-angular-velocity signal RR and the fourth threshold value, it is determined whether or not the second steering-angle command value RUAC2a, which is the output of the anti-rolling controller 50, should be added to the first steering-angle command value RUAC1. In addition, in the case where the rolling-angular-velocity signal RR is smaller than the fourth threshold value, the second gain G2 of the second gain adjustment unit 32 may be decreased to a value that is larger than "0" but smaller than "1". Because while the relative weight of the anti-rolling control is partly left, the azimuth control of the vessel can be continued, the steering-angle control can be performed while keeping balance between the anti-rolling control and the azimuth control.

In the foregoing example, there has been explained the configuration in which the second gain G2 of the second gain adjustment unit 32 can take only a predetermined discrete value. However, it may be allowed that the second gain adjustment unit 32 always monitors the value of the rolling-angular-velocity signal RR and gradually increases the second gain G2 to a continuous value from 0 to 1, as the value of the rolling-angular-velocity signal RR increases. It is significant because a level difference can be prevented from being caused in the steering-angle control command value RUACb due to switching of the control items.

Moreover, it may be allowed that the value of the second gain G2 at a time when the value of the rolling-angular-velocity signal RR is smaller than a predetermined threshold value is stored, as a fixed value at a time when rolling is small, and then is utilized later on. It is significant because the second steering-angle command value RUAC2a, which is the output of the anti-rolling controller 50, can always be reflected to the extent not to affect the riding comfort and hence the anti-rolling control can be continued.

Moreover, it is not required that the first gain G1 of the first gain adjustment unit 31 is a fixed value. In the case where the value of the rolling-angular-velocity signal RR is the same as or larger than a predetermined third threshold value, it may be allowed that the first gain G1 is decreased. It is significant because when rolling is large, the relative weight of the azimuth control can be decreased so as to give priority to the anti-rolling control.

Moreover, it may be allowed that the first gain G1 is gradually decreased to a predetermined value that is larger than 0 but smaller than 1, as the value of the rolling-angular-velocity signal RR increases. It is significant because the azimuth control, which is always necessary, can be continued while being left at a ratio proportional to the predetermined value and a level difference is prevented from being caused due to switching of the control items.

In FIG. 11, the azimuth controller 20a calculates and outputs the yaw-angle error dY, which is the error between the azimuth command signal DC and the yaw-angle signal Y, and the yaw-angular-velocity error dYR, which is the error between the yaw-angular-velocity command signal YRC (target yaw rate) and the yaw-angular-velocity signal YR. It may be allowed that the first gain adjustment unit 31 always monitors the yaw-angle error dY and the yaw-angular-velocity error dYR and changes the first gain G1 to a value of 1 or smaller, when the yaw-angle error dY is smaller than a predetermined first threshold value or when the yaw-angular-velocity error dYR is smaller than a predetermined second threshold value. Moreover, it may be allowed that when the both errors are smaller than a predetermined threshold value, the first gain G1 is gradually decreased to 1 or smaller.

With regard to the azimuth control, in the case where the error from the target value is small, i.e., when the yaw-angle error dY is smaller than the predetermined first threshold value or when the yaw-angular-velocity error dYR is smaller than the predetermined second threshold value, no problem is posed even when the azimuth-control bandwidth is narrowed; this method is significant because the balance between the azimuth control and the anti-rolling control can appropriately be adjusted.

As a result, it is not required that the second steering-angle command value RUAC2a is superfluously superimposed on the steering-angle control command value RUAC; thus, the riding comfort can be suppressed from being deteriorated. In addition, because the relative weight of the first steering-angle command value RUAC1 can be decreased to the extent to satisfy the azimuth-control performance, the respective effects of the azimuth control and the anti-rolling control can be adjusted.

As described above, in addition to the effect of foregoing Embodiment 2, Embodiment 3 further makes it possible that the distribution of the first steering-angle command value RUAC1 that contributes to azimuth holding and azimuth changing and the second steering-angle command value RUAC2a that contributes to reduction of rolling is adjusted and hence the riding comfort of a vessel is suppressed from being deteriorated due to superfluous application of the second steering-angle command value RUAC2a. In addition, because the relative weight of the first steering-angle command value RUAC1 can be decreased to the extent to satisfy the azimuth-control performance, the respective effects of the azimuth control and the anti-rolling control can automatically be adjusted. Furthermore, because the relative weight of the second steering-angle command value RUAC2a can be adjusted in accordance with the state of the rolling-angular-velocity signal RR at a time of sailing, the anti-rolling control can be applied, as may be necessary, to not only a vessel that is liable to roll and has a low course-keeping performance but any vessel.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the present disclosure. For example, there are included the case where at least one constituent element is modified, added, or omitted and the case where at least one constituent element is extracted and then combined with constituent elements of other embodiments.

What is claimed is:
1. A vessel anti-rolling control apparatus comprising:
   an azimuth commander that generates an azimuth command signal indicating an azimuth to which a vessel should travel;
   a yaw-angle detector that outputs a yaw-angle signal indicating a rotation angle around a vertical axis passing through a gravity center of the vessel;

a rolling-angle detector that outputs a rolling-angle signal indicating a rotation angle around an anteroposterior-direction axis passing through the gravity center of the vessel;

a rolling-angular-velocity detector that outputs a rolling-angular-velocity signal indicating a rotation angular velocity around an anteroposterior-direction axis passing through the gravity center of the vessel;

a vessel-speed detector that outputs a vessel-speed signal indicating a vessel speed of the vessel;

an azimuth controller that outputs a first steering-angle command value for making the vessel turn to the azimuth to which the vessel should travel, based on the azimuth command signal and the yaw-angle signal;

an anti-rolling controller that outputs a second steering-angle command value for reducing rolling of the vessel, based on the rolling-angle signal, the rolling-angular-velocity signal, and the vessel-speed signal; and a steering-angle controller that controls a steering angle, based on the first steering-angle command value and the second steering-angle command value.

2. The vessel anti-rolling control apparatus according to claim 1, further comprising a yaw-angular-velocity detector that outputs a yaw-angular-velocity signal indicating a rotation angular velocity around a vertical axis passing through the gravity center of the vessel, wherein the azimuth controller outputs the first steering-angle command value, based on the azimuth command signal, the yaw-angle signal, and the yaw-angular-velocity signal.

3. The vessel anti-rolling control apparatus according to claim 2, wherein the azimuth controller outputs the first steering-angle command value, based on a yaw-angle error, which is a error between the azimuth command signal and the yaw-angle signal, and a yaw-angular-velocity error, which is a error between the yaw-angular-velocity signal and a yaw-angular-velocity command signal generated based on the yaw-angle error.

4. The vessel anti-rolling control apparatus according to claim 1, wherein the yaw-angle signal is a signal indicating a traveling azimuth of the vessel on a horizontal plane perpendicular to gravity.

5. The vessel anti-rolling control apparatus according to claim 1, further comprising a band-pass filter that permits passage of a signal in a predetermined frequency bandwidth, wherein the anti-rolling controller outputs a second steering-angle command value, based on the vessel-speed signal, the rolling-angle signal that has passed through the band-pass filter, and the rolling-angular-velocity signal that has passed through the band-pass filter.

6. The vessel anti-rolling control apparatus according to claim 5, wherein the band-pass filter changes its characteristic in accordance with the vessel-speed signal.

7. The vessel anti-rolling control apparatus according to claim 5, wherein by use of a map or a function whose characteristic changes in accordance with the vessel-speed signal, the anti-rolling controller outputs the second steering-angle command value, based on the rolling-angle signal and the rolling-angular-velocity signal that have passed through the band-pass filter.

8. The vessel anti-rolling control apparatus according to claim 1, wherein the steering-angle controller controls a steering angle, based on the sum of a value obtained by multiplying the first steering-angle command value by a first gain and a value obtained by multiplying the second steering-angle command value by a second gain.

9. The vessel anti-rolling control apparatus according to claim 8, wherein the steering-angle controller determines the first gain in accordance with a yaw-angle error that is a error between the azimuth command signal and the yaw-angle signal.

10. The vessel anti-rolling control apparatus according to claim 8, further comprising a yaw-angular-velocity detector that outputs a yaw-angular-velocity signal indicating a rotation angular velocity around a vertical axis passing through the gravity center of the vessel, wherein the azimuth controller generates a yaw-angular-velocity command signal indicating a target yaw angular velocity, based on a yaw-angle error that is an error between the azimuth command signal and the yaw-angle signal, and wherein the steering-angle controller determines the first gain, based on a yaw-angular-velocity error that is an error between the yaw-angular-velocity command signal and the yaw-angular-velocity signal.

11. The vessel anti-rolling control apparatus according to claim 10, wherein when the yaw-angle error is smaller than a first threshold value or when the yaw-angular-velocity error is smaller than a second threshold value, the steering-angle controller decrease the first gain.

12. The vessel anti-rolling control apparatus according to claim 8, wherein the steering-angle controller determines the first gain, based on the rolling-angular-velocity signal.

13. The vessel anti-rolling control apparatus according to claim 12, wherein when the rolling-angular-velocity signal is the same as or larger than a third threshold value, the steering-angle controller decreases the first gain.

14. The vessel anti-rolling control apparatus according to claim 8, wherein the steering-angle controller determines the second gain, based on the rolling-angular-velocity signal.

15. The vessel anti-rolling control apparatus according to claim 14, wherein when the rolling-angular-velocity signal is smaller than a fourth threshold value, the steering-angle controller decreases the second gain.

16. The vessel anti-rolling control apparatus according to claim 8, wherein each of the first gain and the second gain is 1.

17. A vessel anti-rolling control method comprising:

a step in which an azimuth commander generates an azimuth command signal indicating an azimuth to which a vessel should travel;

a step in which a yaw-angle detector outputs a yaw-angle signal indicating a rotation angle around a vertical axis passing through a gravity center of the vessel;

a step in which a rolling-angle detector outputs a rolling-angle signal indicating a rotation angle around an anteroposterior-direction axis passing through the gravity center of the vessel;

a step in which a rolling-angular-velocity detector outputs a rolling-angular-velocity signal indicating a rotation angular velocity around an anteroposterior-direction axis passing through the gravity center of the vessel;

a step in which a vessel-speed detector outputs a vessel-speed signal indicating a vessel speed of the vessel;

a step in which in accordance with an error between the azimuth command signal and the yaw-angle signal, an azimuth controller outputs a first steering-angle command value for making the vessel turn to the azimuth to which the vessel should travel;

a step in which an anti-rolling controller outputs a second steering-angle command value for reducing rolling of the vessel, based on the rolling-angle signal, the rolling-angular-velocity signal, and the vessel-speed signal; and a step in which a steering-angle controller controls a steering angle, based on the first steering-angle command value and the second steering-angle command value.

\* \* \* \* \*